United States Patent [19]
Lachman et al.

[11] Patent Number: 5,863,508
[45] Date of Patent: Jan. 26, 1999

[54] CATALYTIC REACTOR SYSTEM

[75] Inventors: Irwin M. Lachman, Corning; Mallanagouda D. Patel, Corning; Jimmie L. Williams, Painted Post; Srinivas H. Swarood, Painted Post, all of N.Y.

[73] Assignee: Corning Incorporated, Corning, N.Y.

[21] Appl. No.: 701,225

[22] Filed: Aug. 21, 1996

Related U.S. Application Data

[63] Continuation of Ser. No. 463,481, Jul. 14, 1995, abandoned, which is a continuation of Ser. No. 856,848, Mar. 30, 1992, abandoned, which is a continuation-in-part of Ser. No. 688,967, Apr. 22, 1991, abandoned.

[51] Int. Cl.$^6$ ...................................................... B23B 27/02
[52] U.S. Cl. ............................. 422/171; 60/274; 60/279; 422/169; 423/213.2; 423/245.1
[58] Field of Search ..................................... 422/169, 170, 422/171, 177, 180, 211, 212, 181; 60/274, 279, 299, 300; 502/66, 74, 407; 423/245.1, 210, 213.2

[56] References Cited

U.S. PATENT DOCUMENTS

| | | |
|---|---|---|
| 3,767,764 | 10/1973 | Dolbear . |
| 3,825,654 | 7/1974 | Kobylinski et al. . |
| 3,860,535 | 1/1975 | Johnson ................................. 423/213.7 |
| 3,969,082 | 7/1976 | Cairn et al. ............................... 422/180 |
| 4,008,570 | 2/1977 | Harada ................................ 422/180 X |
| 4,134,733 | 1/1979 | Völker et al. ............................ 422/177 |
| 4,340,403 | 7/1982 | Higuchi et al. ...................... 422/180 X |
| 4,867,954 | 9/1989 | Staniulus et al. ..................... 423/239.1 |
| 4,870,824 | 10/1989 | Young et al. .............................. 60/723 |
| 4,906,443 | 3/1990 | Gandhi et al. ........................ 423/213.7 |

FOREIGN PATENT DOCUMENTS

| | | |
|---|---|---|
| 0 369 576 | 8/1989 | European Pat. Off. . |
| 6 608 292 | 3/1986 | Germany . |
| 59136140 | 2/1985 | Japan . |

*Primary Examiner*—Timothy McMahon
*Attorney, Agent, or Firm*—L. Rita Quatrini

[57] ABSTRACT

An apparatus and method for converting exhaust gases to innocuous products is disclosed. Exhaust gas is conveyed by a first conduit to, and passed through a first multicellular unit in which a portion of the cells are catalyzed with a first catalyst for reacting at least a portion of the $NO_x$ to ammonia, and thereafter the resulting modified mixture only is conveyed by a second conduit from the first unit and to a second multicellular unit to react the ammonia and the remaining $NO_x$ to produce innocuous products. The second conduit is connected only to the first and second units. The passage of the exhaust gas through the units results in conversion of $NO_x$, CO, and hydrocarbons to innocuous products.

23 Claims, 10 Drawing Sheets

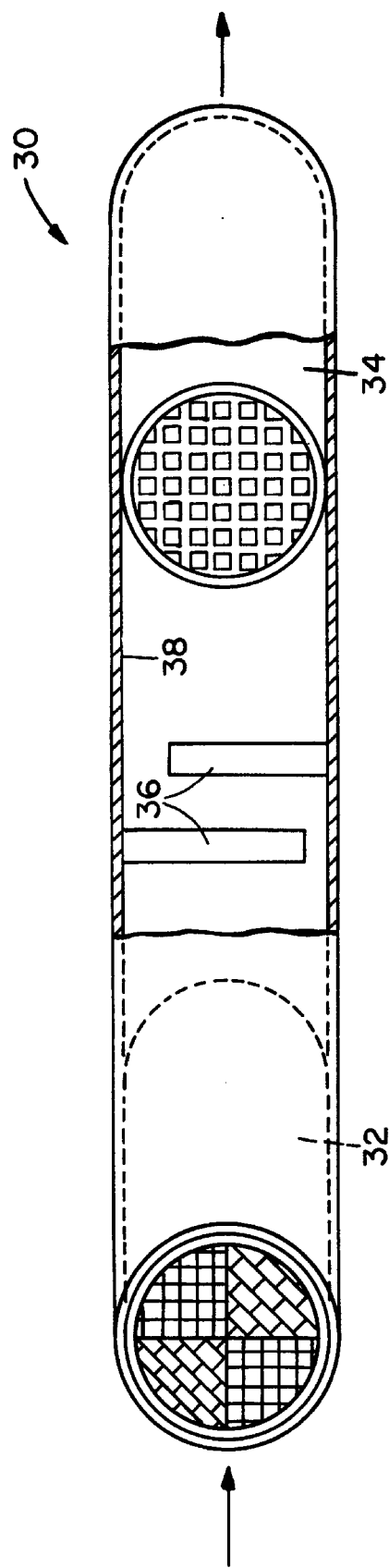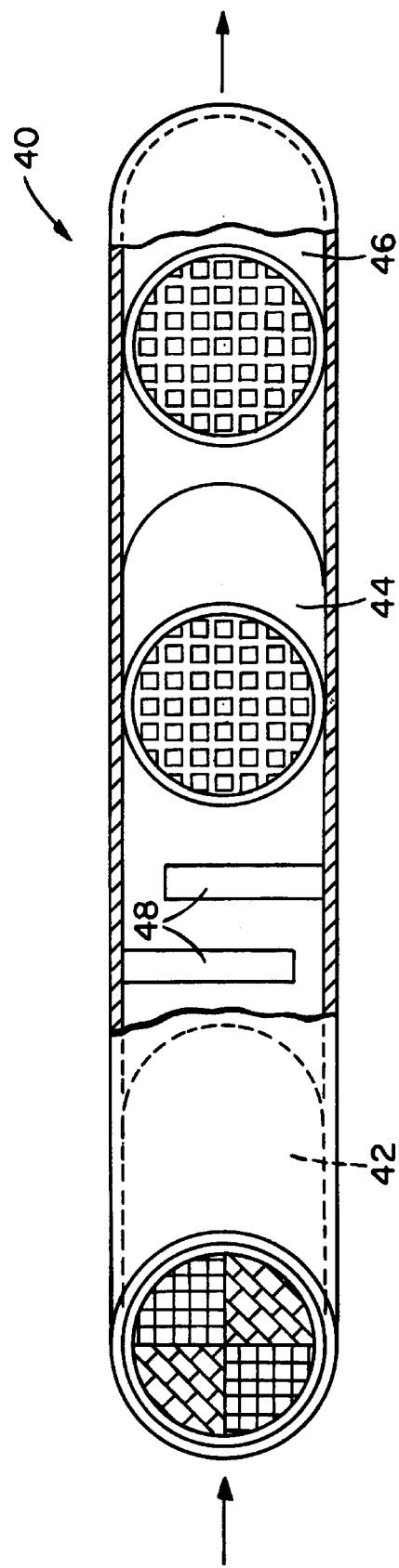

CATALYTIC REACTOR SYSTEM

CROSS REFERENCE TO RELATED APPLICATION

This is a continuation of Ser. No. 08/463,481, filed on Jul. 14, 1995, now abandoned, which is a continuation of Ser. No. 07/856,848 filed on Mar. 30, 1992 now abandoned, which is a continuation-in-part of application Ser. No. 07/688,967, filed Apr. 22, 1991, now abandoned.

This invention relates to a method and apparatus for converting $NO_x$, CO, and hydrocarbons to innocuous products. An exhaust gas mixture is passed through a first multicellular unit which is catalyzed with a first catalyst for converting a portion of the $NO_x$ to ammonia. Thereafter the resulting modified mixture containing the ammonia and the remaining $NO_x$ is passed through a second multicellular unit to react the ammonia and the remaining $NO_x$ in the presence of a second catalyst. Passage of the exhaust gases through the unit results in conversion of the $NO_x$, CO, and hydrocarbons to innocuous products. The system and apparatus are especially suited for conversion of exhaust gas resulting from automotive combustion.

BACKGROUND OF THE INVENTION

Mixtures of oxides of nitrogen, commonly called $NO_x$ gases are generated as by-products in combustion processes such as in automotive engines or in fossil fuel power plants. These oxides are hazardous to health and the environment as they produce acid rain.

Up to the present time $NO_x$ emissions in automotive and stationary power plants have been controlled by reducing them to nitrogen by a three way catalyst (TWC) such as [Pt and/or Pd+Rh]/$CeO_2$—$Al_2O_3$ and selective catalytic reduction (SCR) using a catalyst such as $V_2O_5/TiO_2$ or [Fe,Cu, etc]-Zeolite respectively.

In a low oxygen content system, rhodium (Rh) selectively reduces $NO_x$ to $N_2$ in stoichiometric ratio, that is, in a ratio of reducing agents to oxidizing agents of about 1, whereas Pt catalyzes the reduction of $NO_x$ to ammonia. This is an undesirable product so that even though platinum is used in automotive catalysts, enough Rh must be present to catalyze reduction to $N_2$. In SCR reactions an external ammonia source is needed to reduce $NO_x$ to $N_2$ over vanadia or zeolite catalysts. Thus it has been impossible to use SCR catalysts and reactions in automotive exhaust cleaning up to now because supplying $NH_3$ in precise amounts is difficult and impractical.

U.S. Pat. No. 3,767,764 relates to a method for converting hydrocarbons, carbon monoxide, and nitrogen oxides in auto exhaust gases to innocuous entities which comprises contacting the gases from half of the engine cylinders with a catalyst specific for reducing nitrogen oxides to ammonia in a first catalytic converter, mixing the portion with air to provide a net oxidizing atmosphere and with the balance of the exhaust gases and contacting the mixture with an oxidation catalyst in a second catalytic converter to convert the hydrocarbons, carbon monoxide, and nitrogen oxides to innocuous entities.

It would be highly desirable, therefore, to have a catalyst system which would be able to catalyze reactions of combustion exhaust gases efficiently and economically without rhodium and without having to supply external ammonia or oxygen thereto.

SUMMARY OF THE INVENTION

In accordance with one aspect of the invention, there is provided a method for converting exhaust gases to innocuous products. The method involves conveying exhaust gases from combustion, which comprise $NO_x$, CO, and hydrocarbons and which have a redox ratio greater than 1 to a first catalytic unit. The unit has an inlet end, and an outlet end, and a multiplicity of open-ended cells extending from inlet end to outlet end. A portion of the cells are catalyzed with a first stage catalyst which is a noble metal and a support and is absent rhodium. The exhaust gases are passed through the first catalytic unit to effect the reduction of a portion of the $NO_x$ in the exhaust gases to ammonia by the first stage catalyst, thereby yielding a modified gas mixture. The modified gas mixture only, is conveyed to a second unit having an inlet end, and an outlet end, and a multiplicity of open ended cells extending from inlet end to outlet end, this unit being catalyzed with a second stage catalyst. The modified gas mixture is passed through the second unit to effect second stage reactions by the second stage catalyst in which the ammonia is reacted with the remaining $NO_x$, thereby yielding a converted gas mixture. The passage of the exhaust gases through the first and second catalyzed units results in conversion of $NO_x$, CO, and hydrocarbons to innocuous products. The converted gas mixture is conveyed to ambient atmosphere.

In accordance with another aspect of the invention, there is provided an apparatus suitable for converting exhaust gases to innocuous products. The apparatus is made up of a first catalytic unit as described above. A first conduit is connected to the inlet end of the first unit, for conveying the exhaust gases to the inlet end of the first unit to reduce the $NO_x$ and produce the modified gas mixture as described above. There is a second catalytic unit as described above. A second conduit, one end of which is connected to the outlet end of the first unit and the other end of which is connected to the inlet end of the second unit, conveys only the modified gas mixture to the second unit to effect second stage reactions as described above. The inlet end of the second unit is connected only to the other end of the second conduit.

BRIEF DESCRIPTION OF THE FIGURES

FIG. 2b is an enlarged view of FIG. 2a.

FIG. 3 is a schematic diagram showing a typical arrangement of a catalytic system of the present invention in which two units are arranged in sequential order for sequential catalytic reactions.

FIG. 4 is a schematic diagram showing an arrangement of a catalytic system of the present invention in which three units are arranged sequentially.

DETAILED DESCRIPTION OF THE INVENTION

This invention relates to a catalytic reactor in which substrates are catalyzed with catalysts in various patterns and configurations. A single substrate unit can be catalyzed with one or more catalysts in alternate sections or alternately with non-catalyzed sections. A plurality of substrate units each unit catalyzed with one or more catalysts can comprise the reactor system.

This invention relates additionally to a multi-stage catalytic reactor system for catalyzing the conversion of $NO_x$, CO and hydrocarbons to innocuous products. A portion of a fluid mixture comprising the $NO_x$, CO, and hydrocarbons is contacted with a first stage catalyst to convert the $NO_x$ contained therein to ammonia. The remaining portion of the fluid mixture whether it is also reacted in a separate stage or is unreacted, is then reacted with the ammonia generated in the first stage in the presence of a second stage catalyst to convert $NO_x$ to innocuous products. Rhodium is not present as part of any catalyst in the present invention. By innocuous products is meant those that are generally harmless to health and the environment such as $CO_2$, water, $H_2$, and $N_2$.

Multi-Stage Catalytic Reactor

Figure 1:
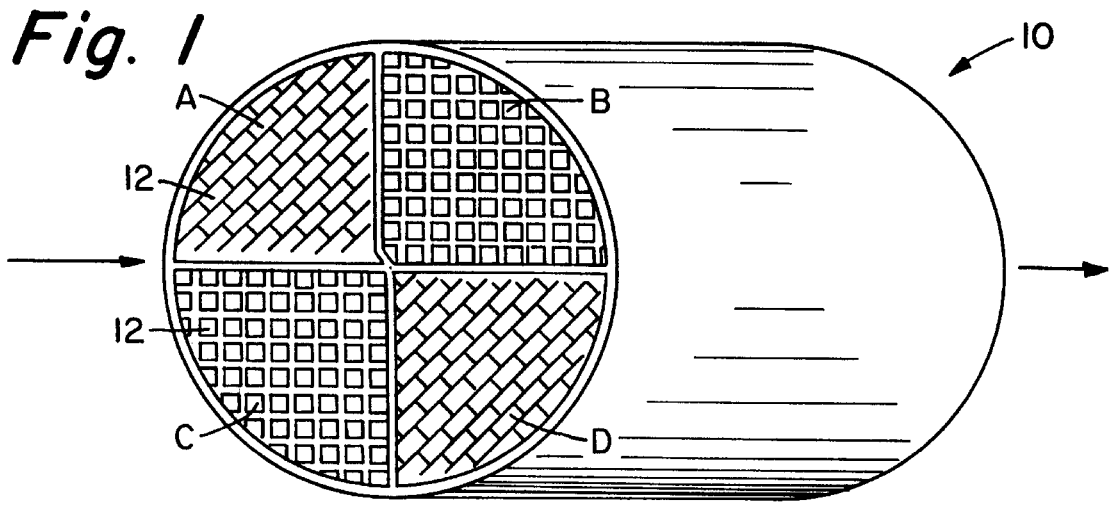
FIG. 1 is a schematic diagram of a typical substrate unit having a multiplicity of cells, and divided into sections which are catalyzed in predetermined patterns.
Figure 2A:
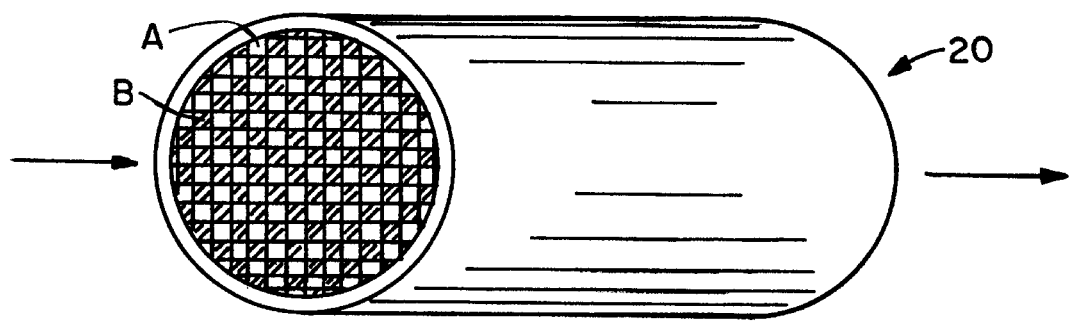
FIG. 2a is a schematic diagram of another typical substrate unit having a multiplicity of cells arranged in rows wherein alternate rows are catalyzed in predetermined patterns.
Figure 2B:
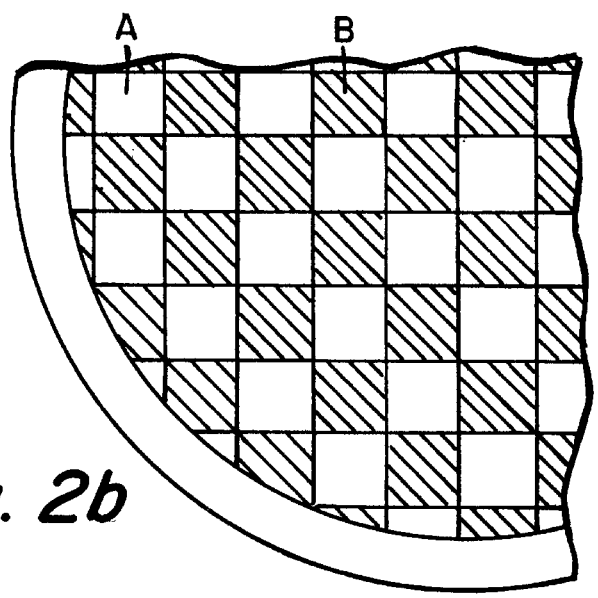

The catalytic reactor can be comprised of a single substrate unit catalyzed with one or more catalysts in various patterns and configurations depending on the application. A single substrate unit can be catalyzed with one or more catalysts in alternate sections in which either the different types of catalysts are alternated or non-catalyzed portions of the unit are alternated with catalyzed portions. For the purposes of the present invention, the combination of a given specific catalyst with the substrate is referred to as a catalytic stage. A material can be both substrate and at least part of the catalyst, if appropriate to the application. A unit is a monolith having an inlet end through which the reactant mixture enters the stage, and an outlet end through which the catalyzed reaction products exit the stage. The unit itself has a multiplicity of open ended cells which are arranged in rows extending from the inlet end to the outlet end. The unit is made typically of ceramic material, glasses, glass ceramics, metal, metal oxides, molecular sieves, or combinations of these. Some materials that are suited as substrate materials in accordance with the practice of the present invention are cordierite, nitrides, carbides, borides, and intermetallics, mullite, alumina, zeolites, lithium aluminosilicate, titania, feldspars, quartz, fused or amorphous silica, clays, aluminates, titanates such as aluminum titanate, silicates, zirconia, spinels, and combinations thereof. Some typical substrates, although it is to be understood that the invention is not limited to these, are disclosed in U.S. Pat. Nos. 4,127,691 and 3,885,977 which are assigned to the same assignee as the present application. Those patents are herein incorporated by reference as filed. The walls defining at least some of the cells are catalyzed. The catalysts can be brought in contact with the walls by methods known in the art. FIG. 1 is a schematic diagram showing a typical substrate unit (10) having a multiplicity of cells (12). The unit is divided into four quadrants: A, B, C, and D. Quadrants B and C are in contact with one type of catalyst to form one catalytic stage of the system. Quadrants A and D are in contact with another catalyst to form another such stage. As an example of another embodiment in which this basic configuration is used, two of the quadrants, eg., B and C, can have a catalyst (forming one stage) and the remaining two quadrants can be without any catalyst. The arrows in this and all the figures indicate the flow of a reactant mixture through the unit. This unit can be fabricated by methods known in the art such as by piecing together precatalyzed or non catalyzed sections in the desired configuration to make the single unit; or by contacting a single unit in predetermined sections, eg, by coating with the desired catalysts. FIG. 2a is a schematic diagram showing another configuration typical of the present invention. Pictured is a substrate unit (20) having alternate rows of cells (alternate channels), A and B, in contact with either two different catalysts (catalyst A and catalyst B) or with one catalyst eg, A, alternating with a non-catalyzed portion, B. FIG. 2b is an enlarged view of FIG. 2a. This unit can be made by alternate channel coating techniques. One preferred technique of alternately coating channels of a substrate is as follows, although it is to be understood that the invention is not limited to such. Rows of cells of a multicellular structure such as a honeycomb are selectively plugged at their ends in a predetermined pattern. The unplugged cells are then catalyzed by, for example, pouring a washcoat of the catalyst components through the open channels or by immersing the structure in the washcoat. The structure is then cleared of excess material by, for example, blowing compressed air through the open channels. The structure can be dried and fired as necessary, and additional washcoats can be put on the structure if necessary. When the open cells are sufficiently catalyzed, the ends of the structure can be cut off to reopen the plugged cells. At this point, the structure can be used as is, having a catalyzed portion and a non-catalyzed portion, or the catalyzed cells can be plugged and the remaining non-catalyzed portion can be catalyzed by, for example, the previously described technique. Another technique used to alternately catalyze multicellular structures is to use a mask having perforations in a predetermined pattern, positioned at one end of the structure to block a portion of the channels and to allow the other portion to remain open. The washcoat is introduced into the openings of the mask and the unblocked channels to catalyze these channels. The mask is then removed. If it is desired to catalyze another portion of channels with another type of catalyst, another mask or the same one can be positioned in such a manner to allow only the channels to be catalyzed to be open. Some typical masking techniques are described in U.S. Pat. Nos. 4,427,728, 4,576,774, and 4,557,962 which are assigned to the same assignee as the present application. Those patents are herein incorporated by reference as filed. One use of a unit with alternating sections such as the types shown in FIGS. 1 and 2a and 2b, is for splitting a reactant mixture into portions that are to be reacted differently depending on the application. The design of the unit itself offers a means for splitting reactant mixtures. Depending on the desired reactions for the relative portions of the reactant mixture, the catalyzed and non-catalyzed portions, if any, can be composed in any configuration and size suited to the application. For example, the substrate channel areas on one unit can be different sizes to accommodate any desired split.

Another variation in which either a catalyzed portion and a non-catalyzed portion or more than one catalysts are present on one unit, is in the use of crimped metal monolith honeycombs. Crimped metal monoliths are made by putting together a crimped metal sheet and a planar sheet. The surfaces of the sheets can be catalyzed or non-catalyzed in various patterns and configurations suitable to the application.

In accordance with still another embodiment, two or more of the units can be arranged sequentially so that a reactant mixture can flow through each unit in turn to undergo catalyzed reactions depending on the specific application. Each unit can have one or more catalysts thereon in various patterns to comprise the reactor system.

In all stages, respective catalyst and substrate can be in contact by any means which insures that the catalyst will remain intact during the catalytic reaction. For example, the catalyst can be present as a coating on the substrate, or it can be present as an integral part of the substrate. Additionally, as mentioned earlier, the substrate and at least part of the catalyst can be one and the same. For example, in some embodiments, molecular sieves, eg zeolites, can serve as both catalysts and substrates. Some of the typical methods of contacting the catalysts with substrates in the practice of the present invention will be described later.

In accordance with yet another embodiment, the reactor can have mixing means placed before any unit or between units to uniformly mix any one or combination of mixtures before it contacts that stage. The mixing means can be any arrangement depending on the application and geometry of the system, such as baffles, ceramic discs, or static mixers. FIG. 3 shows a typical arrangement (30) in which two units (32) and (34) of the basic shape shown in FIG. 1 are sequentially arranged having two baffles (36) as mixing means placed between them. A further advantage of the arrangement shown in FIGS. 2a and 2b is that the alternate channeling offers a built-in mixing, so that the output from such a unit is uniform by virtue of the configuration itself.

The reactor system including mixing means is typically enclosed in a container the type of which depends on the application. For example in a catalytic converter system for automobile emissions, the system is enclosed in steel cans with insulation. In FIG. 3 the container is shown as (38). The two baffles are shown each attached to opposite sides of the container. Mixing means can be attached by conventional methods such as by welding or riveting metal baffles into place, etc.

Apparatus and Method for Removing $NO_x$ and Other Pollutants

In accordance with one embodiment of the present invention there is provided an apparatus (system) and method for removing $NO_x$ and other pollutants as CO and hydrocarbons from fluid mixtures. The system makes use of some of the basic configurations described above but which is adapted especially for removal of these pollutants from exhaust gases or fluid mixtures which result from combustion processes such as those that are generated in automotive combustion and in fossil fuel power plants and in gas turbine cogeneration power plants.

The initial fluid mixture or exhaust gas mixture which is to be converted contains typically $NO_x$, carbon monoxide, and hydrocarbons such as paraffins, olefins, and aromatics, and water, nitrogen, and oxygen. Other components such as carbon dioxide, hydrogen, and sulfur dioxide can be present also.

The apparatus and method for catalyzing the reactions of $NO_x$, CO, and hydrocarbons according to the present invention will now be described.

Figure 12:
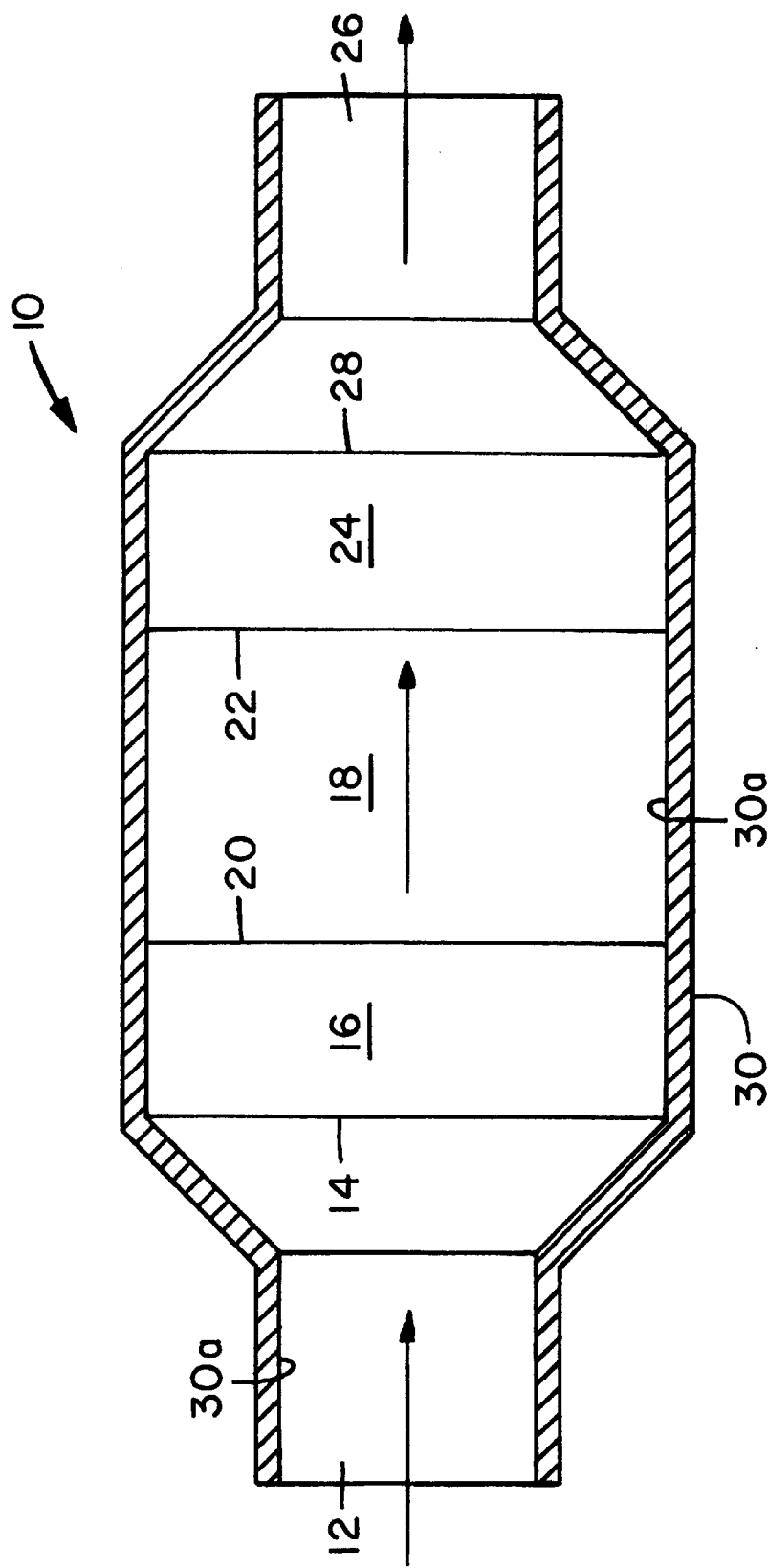
FIG. 12 is a diagram showing the first and second units with the respective conduits.

FIG. 12 shows a diagram showing a preferred apparatus (10) of the present invention. The apparatus (10) is made of a first conduit (12) which is connected to the inlet end (14) of first catalytic unit (16). An exhaust gas mixture such as auto exhaust, is conveyed in its entirety through the first conduit to the inlet end of the first unit, into the first unit to undergo catalytic reactions in which a portion of the $NO_x$ is converted to ammonia in the presence of the first stage catalyst with production of a modified gas mixture. A second conduit (18) is connected at one end to the outlet end (20) of the first unit. The other end of the second conduit is connected to the inlet end (22) of second unit (24). The modified gas mixture only, is conveyed through the second conduit to the second unit to undergo reactions in which the ammonia reacts with the remainder of the $NO_x$ to produce innocuous products, eg., $N_2$ with production of a converted gas mixture. The second conduit is connected only to the outlet end of the first unit and the inlet end of the second unit. Therefore, it can be seen here that the mixture which enters the inlet end of the second unit is not mixed with any other agents. For example, there is no mixing of the mixture entering the second unit with oxidizing agents as air or oxygen. This eliminates the need for extra valving in the apparatus to deliver oxidizing agents. By passing an exhaust gas mixture through this apparatus at a redox ratio of greater than 1, conversion of $NO_x$, CO, and hydrocarbons is effected. Furthermore, there is no addition of external ammonia to any part of the apparatus or to any mixture. The ammonia needed for the reactions is generated in the first catalytic stage. An exit conduit (26) is shown connected to the outlet end (28) of the second unit. The converted gas mixture passes through the exit conduit to ambient atmosphere. The arrows indicate the direction of flow through the apparatus.

It is to be understood that the respective conduits can be connected to the respective units by any means known in the art. It is to be understood also that respective sizes and lengths of the conduits and units can vary depending on the application and that the invention is not limited to any sizes or size relationships of conduits and catalyzed units.

FIG. 12 shows the units in a conventional canister or can shown as (30) with the inner surface shown as 30a, as is used in automotive applications. The units are held fixed in the canister by conventional means such as, for example, by metal mesh, or ceramic mats, etc. Refractory fibrous material is often used to prevent passage of gases between the units and the canister. The various sections of the can serve as the respective conduits and for the purposes of the present invention are considered to be connected to the units. Positioning of two units is also shown in FIG. 3 with container (38) providing the conduits (not numbered).

In accordance with another embodiment, a third unit can be placed in the can in which case a third conduit is connected to the outlet end of the second unit and to the inlet end of the third unit.

In accordance with another embodiment, each unit can be enclosed in a separate can and the inlet and outlet ends of each canister can serve as the respective conduits.

The initial fluid mixture (exhaust gas) is split into two portions, a first portion and a second portion. It is preferred that the first portion be sufficient to provide a sufficient amount of $NO_x$ to be converted in the first stage to the stoichiometric amount of ammonia required to convert the remaining $NO_x$ to innocuous products in the second stage. The relative sizes of the portions can be adjusted to deliver the required amounts of pollutants for the desired reactions and conversely, the catalyst-substrate system can be designed to convert the desired amount of $NO_x$ to ammonia. The regulation of the splitting of the initial fluid mixture to deliver the correct amount of $NO_x$ for the specific system, can be accomplished by methods such as feedback sensors to regulate the flow of the fluid mixture to the system. The regulation of the splitting can be accomplished also by the configuration of the catalyst stages, for example, use of the configurations described previously in a manner which will be described later.

Mixing means can be positioned before any stage or between any stages and used as described earlier.

In order for the catalytic system to efficiently convert the $NO_x$ to innocuous products, the first portion must have a mole ratio of reducing agents (such as the carbon monoxide and hydrocarbon components of the mixture) to oxidizing agents (such as the $NO_x$ and $O_2$ components of the mixture), commonly referred to as the redox ratio, of greater than about 1, and preferably about 1.1 to about 2.0. The redox ratios are average figures. These ranges are commonly referred to as the redox ratio window. In an automotive exhaust system this ratio is controlled by regulating the amount of air to the fuel which is called the air to fuel ratio. In lean burn engines, that is, those in which the redox ratio is on the low side due to lower fuel content in the mixture, the ratio can be adjusted by adding reducing agents to the first portion. In power plant gases, the redox ratio is typically lower than the operating ranges of the present invention, and therefore, to adjust the redox ratio to the proper levels, reducing agents such as non-combusted fuel can be added.

The first stage of the catalytic system of the present invention is made up of a substrate catalyzed with a catalyst. For the purposes of the present invention this catalyst is referred to as the first stage catalyst and the substrate is referred to as the first stage substrate.

The first portion of the fluid mixture is contacted with the first stage catalyst to undergo first stage reactions some of which are described as follows. The major portion of the $NO_x$ contained in this first portion is converted to ammonia. This is typically greater than about 50% by volume of the $NO_x$ contained in the first portion. This is done through a series of reactions in which the CO and water (in automotive exhaust, water is present from the combustion process) are converted to $CO_2$ and $H_2$. The $H_2$ in turn reacts with the $NO_x$ to produce $NH_3$. Other reactions which can take place in this stage are oxidation reactions in which essentially all of the CO and hydrocarbons are converted to innocuous products.

The first stage catalyst is made up of a noble metal component, in combination with a support, the combination of which is able to catalyze the desired first stage reactions. The noble metal component is preferably platinum, palladium or combinations of these. The preferred noble metal component is present preferably at a level of about 0.01% to about 5% by weight of the first stage catalyst, and most preferably at a level of about 0.5% to about 1.5%. The first stage catalyst and the other catalysts of the present invention are absent rhodium. The support can be types of alumina such as gamma alumina or lanthanum beta alumina, or silica, titania, spinels, zirconia, or combinations of these. The preferred type of support is a high surface area oxide. Typically a high surface area support is chosen so that it together with a substrate such as a ceramic honeycomb has a surface area of about 10 $m^2/g$ to about 100 $m^2/g$. A preferred high surface area support is gamma alumina. In order for the desired reactions to be carried out, it is preferred to have a water gas shift catalyst as part of the first stage catalyst to catalyze the reaction of CO and water to produce carbon dioxide and hydrogen which was explained earlier. The water gas shift catalyst component can be oxides of cerium, nickel and iron or combinations of these. The preferred water gas shift component is ceria.

Some preferred first stage catalysts are: (1) platinum-cerium oxide-aluminum oxide, (2) palladium-cerium oxide-aluminum oxide, and (3 platinum-palladium-cerium oxide-aluminum oxide.

The preferred make-up of the first stage catalyst is in percent by weight about 0.01 to about 5 noble metal, about 20 to about 50 ceria, and the balance alumina, and more preferably about 0.8 to about 2.0 noble metal, about 25 to about 40 ceria, and the balance alumina. One especially preferred first stage catalyst composition is about 1% by weight platinum, about 30% by weight ceria, and the balance alumina.

The catalyst can have also stabilizers such alkaline earth oxides, phosphates and combinations thereof.

The substrate physically holds the catalyst in place in a reactor system. Typical substrate materials are described earlier. The first stage substrate in this embodiment can be any shape suited to the application such as, for example, beads, pellets, rings, monoliths, minimonoliths, and honeycombs. Honeycomb structures are preferred. The most typical first stage substrates used in the practice of the present invention especially in the clean-up of automotive exhaust are those made of ceramic material preferably having a honeycomb structure. Especially preferred first stage substrates are made of cordierite having a honeycomb structure of the type disclosed in U.S. Pat. No. 3,885,977. The first stage substrate can be one piece which is in contact with the catalyst in a predetermined pattern, or it can be made up of several discrete pieces which are bonded or held together. The especially preferred types of substrate, honeycomb substrates, are shown in FIGS. 1 and 2a and 2b as described previously. In FIG. 1, for example, sections B and C are in contact with the first stage catalyst. In FIGS. 2a and 2b, the first stage catalyst is in contact with alternate rows of cells, (alternate channels), for example, channels B.

The remaining or second portion of the initial fluid mixture can remain unreacted at this point or it can be subjected in its entirety or in part to a series of reactions in an auxiliary stage in the presence of an auxiliary catalyst.

In accordance with one embodiment, the second portion of the mixture is contacted with a non-catalyzed substrate. In FIG. 1, sections A and D, for example can be non-catalyzed. In FIGS. 2a and 2b, non-catalyzed channels, for example, channels A can alternate with first stage catalyzed channels, B.

In accordance with another embodiment, the second portion is contacted with an auxiliary stage in which an auxiliary substrate is catalyzed with an auxiliary catalyst. In FIG. 1, sections A and D, and FIG. 2a and 2b, channels A can be catalyzed with an auxiliary catalyst.

Furthermore, if part of the remaining portion is to be reacted with an auxiliary catalyst and the remaining part is to be unreacted at this point, the catalyzed and non-catalyzed portions can be incorporated accordingly onto the substrate unit.

Passage of the fluid mixture into a unit having such patterns of catalyzed and non-catalyzed sections, affords an automatic split of the fluid mixture. There is no need for extra valving to split the mixture.

If an auxiliary stage is used, the auxiliary catalyst is preferably one which catalyzes the conversion of at least some of the hydrocarbons present to innocuous products or which removes at least some of the hydrocarbons. One type of catalyst that is especially suitable for this application is molecular sieves, preferably zeolites such as ZSM-5 zeolite, mordenite, and Y-type. Especially preferred is ZSM-5 zeolite. This material can function also by adsorbing hydrocarbons. The auxiliary substrate can be of the same materials and types as the first stage substrate. The auxiliary catalyst can be coated onto the substrate using a binder such as alumina, or be formed in situ on the substrate. In accordance with one preferred embodiment the auxiliary catalyst, zeolite, is brought into contact with a monolithic ceramic substrate by crystallizing the zeolite on the surface of the substrate. This method is disclosed in U.S. Pat. No. 4,800,187 which is assigned to the same assignee as the present application. That patent is herein incorporated by reference as filed. Use of this stage boosts the conversion of the hydrocarbons to innocuous products.

The following mixtures make up the input to the second stage. The ammonia-containing exit or output mixture resulting from the first stage reactions along with any of the following three types of mixtures: (1) the remaining or second portion of the initial mixture, as is, if it has not been reacted at this point, (2) the output mixture from the auxiliary catalytic reactions if an auxiliary catalyst has been used, and (3) if part of the second portion has been reacted and part has remained unreacted, both the unreacted part and the output from the reacted part. The combination of mixtures is called the modified gas mixture.

It is preferred to premix any combination of mixtures which are to be the second stage input, (modified mixture) prior to contact with the second stage. This allows the second stage reactions to proceed more efficiently. The mixing means can be for example baffles placed before the second stage as shown in FIG. 3 described previously. If the first stage configuration is alternate channels of a honeycomb, the respective output mixtures from these channels are automatically mixed by virtue of the configuration as described earlier.

The second stage reactions are as follows. The ammonia is reacted with the $NO_x$ present to produce innocuous products. Other reactions which take place in this stage are oxidation reactions of the CO and hydrocarbons to innocuous products.

The second stage of the catalytic system of the present invention is made up of a second stage substrate catalyzed with a second stage catalyst. The second stage catalyst is a selective catalytic reduction catalyst commonly called an SCR catalyst. The SCR catalyst is chosen according to the temperature range of operation expected in the second stage. Some second stage selective reduction catalysts which are especially suited to the practice of the present invention are molecular sieves with at least one metal. The metals are typically those of atomic numbers 21 thru 30, 39 thru 42, 44 thru 47, and 57 thru 79. The preferred metals are those of atomic numbers 22 thru 29. The most preferred metals are Fe and/or Cu. Typically, the metal is ion exchanged into the molecular sieve, or the metal is adsorbed into the molecular sieve. The preferred molecular sieves are zeolites. Preferred zeolites are mordenite, pentasil structure zeolite such as ZSM type zeolites, in particular ZSM-5 zeolite, and faujasite (Y-type family). Some SCR catalysts that are especially suited to the practice of the present invention are Y-type, mordenite, ZSM-5 zeolites and combinations thereof with Pt, Pd, Co, Cr, Ni, Fe, Cu, Mn, V, Mo, W, La, Ru, Re, Ir, and combinations thereof. Also, $V_2O_5/TiO_2$ can be used as the second stage catalyst and modifiers as Mo, W, etc., and mixtures of these can be used with this catalyst. Any combination of the above SCR catalysts can be used. The especially preferred second stage catalysts of the present invention are Fe and/or Cu ion exchanged zeolites such as Fe mordenite, Fe-ZSM-5 zeolite, Cu mordenite and Cu-ZSM-5 zeolite. The second stage substrate can be of any of the types described above for the first stage substrate.

In accordance with one embodiment, the zeolite is first ion-exchanged with the metal and then plasticized and extruded into a honeycomb structure. In accordance with another embodiment, a solution of a metal salt is contacted with a pre-formed zeolite structure. In these cases, the zeolite is considered part of the catalyst and serves as the substrate.

In addition to the first and second stages and, optionally the auxiliary stage, there can be more stages, if necessary. For example, in accordance with another embodiment, the output mixture from the second stage reactions is contacted with a third stage made of a third stage substrate catalyzed with a third stage catalyst to undergo third stage reactions. These reactions are mainly oxidation reactions of any hydrocarbons or CO which might still be present, to innocuous products. The third stage catalyst can be any oxidation catalyst capable of catalyzing these reactions. The preferred third stage catalyst is the same as the preferred first stage catalyst. Again, here there is no rhodium in the catalyst.

FIG. 4 shows a system (40) made of first, second and third stages, (42), (44), and (46), respectively with mixing means (48) placed as in FIG. 3.

The substrates of any of the stages can be the same or different from one another depending on the application and the particular catalyst used.

In power plants, the exhaust gas (initial fluid mixture) can be split into the two portions or streams using honeycomb substrates such as those previously described. In one portion, the relatively high amounts of oxygen present can be reduced by burning natural gas or any other reducing gas composition, thus providing a reducing atmosphere. In this reducing atmosphere approximately half of the $NO_x$ gases are converted to ammonia on the first stage catalyst. This generates a stoichiometric amount of ammonia that can then react with unreacted $NO_x$ to form $N_2$ and $H_2O$ on the second stage catalyst. Thus the present invention eliminates the need for an outside supply of ammonia to the exhaust gas.

Overall, the major portion of the $NO_x$ contained in the initial fluid mixture is converted to innocuous products. This is taken to mean greater than than about 50% by volume. No significant amounts of ammonia are produced as end products of the system. This means typically no greater than about 220 ppm by volume $NH_3$.

To more fully illustrate the invention, the following non-limiting examples are presented.

The following test procedure is carried out on various types of catalysts to determine their effectiveness in converting pollutants to innocuous products.

Simulated automotive gas mixtures of relatively uniform composition are introduced into an enclosed reactor system holding catalyzed or non-catalyzed substrates measuring about 1" in diameter and about ½" to 1" in length. The mixtures are contacted with the various types of catalysts. Each mixture consists of by volume about 1000 ppm of $NO_x$, about 333 ppm of propylene, about 167 ppm of propane, about 1.0% of CO, about 0.33% $H_2$, about 0.77% of $O_2$, about 14.0% $CO_2$, and the balance $N_2$. The space velocity of the enclosed system is about 50,000 volume changes/hr. The $NO_x$, CO, hydrocarbon, and resulting $NH_3$ gases are monitored by individual detectors. The gas conversions are directly measured as percent conversion by volume compared to inlet concentrations. In each test, the temperature of the container is slowly raised to about 600° C. and at this temperature the oxygen concentration of the gas mixture that is being reacted is varied to determine the effect of redox ratio on conversions and $NH_3$ production.

The following examples of catalysts are subjected to the testing procedure to determine their effectiveness in converting pollutants to innocuous products.

EXAMPLE 1

Figure 5:
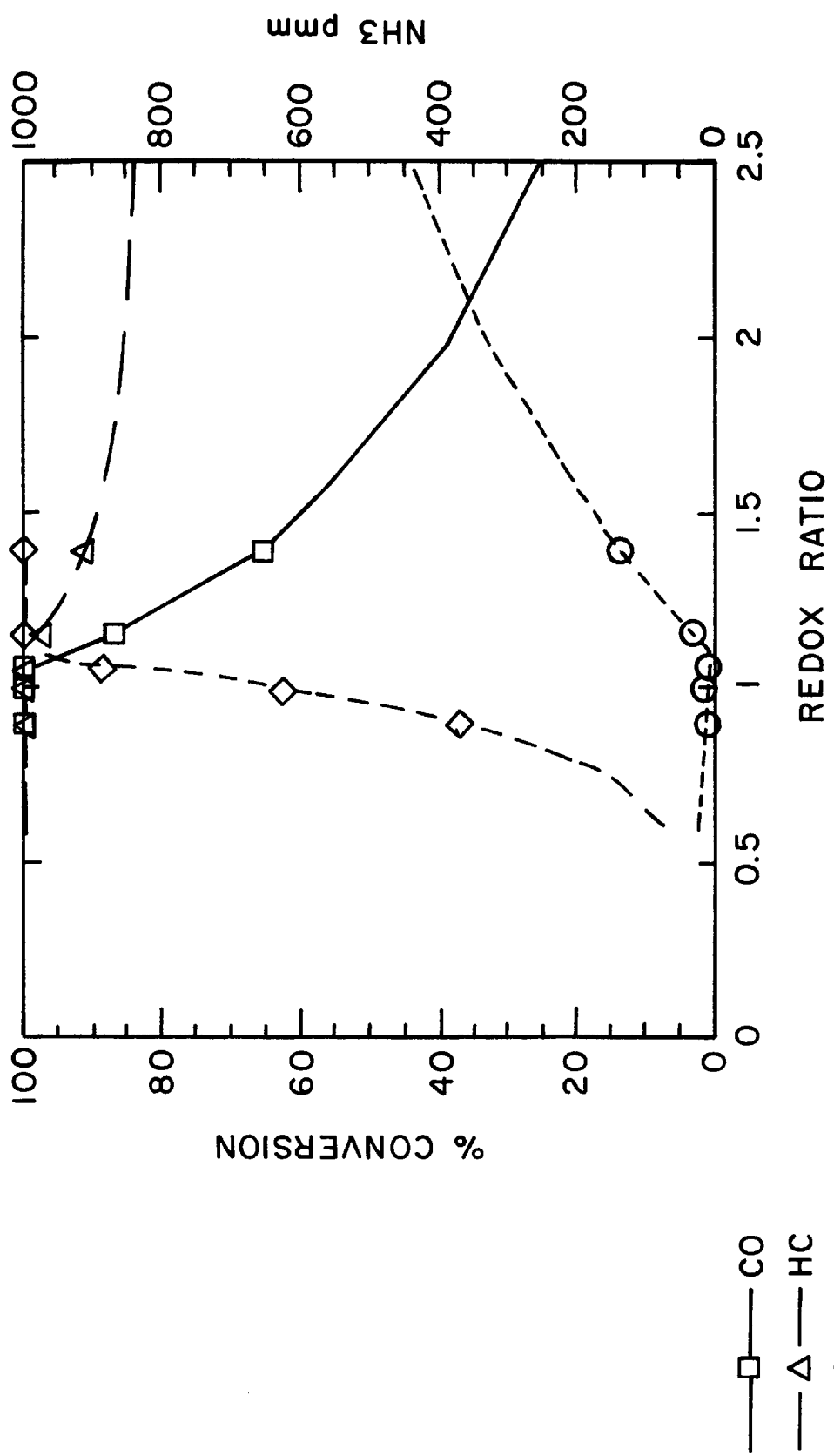
FIG. 5 is a plot of conversion of $NO_x$, CO, and hydrocarbons and production of ammonia versus redox ratio when a commercial automotive catalyst of Pt/Rh/$Al_2O_3$/$CeO_2$ is used.

A commercially available automotive catalyst of Pt/Rh/$Al_2O_3$/$CeO_2$ on a ceramic honeycomb substrate measuring about 1" in diameter and about 1" in length is used as a comparative example. A gas mixture of the type previously described is contacted in various redox ratios with this catalyst. The volume percent conversion and ammonia formation (ppm by volume) are given in FIG. 5. From FIG. 5 it can be seen that the conversions and ammonia formation at the given redox ratios are as expected for this catalyst system having rhodium.

EXAMPLE 2

The Pt/$Al_2O_3$/$CeO_2$ catalysts on ceramic honeycomb substrates are prepared according to the following procedure.

Ceria-doped gamma alumina powder is first prepared as follows:

About 55 g of gamma alumina is added to about 7.81 g of cerium nitrate solution (99.5% purity and about 28% equivalent $CeO_2$) in about 56 ml deionized water followed by adjustment of the pH to about 3.8 with dilute $HNO_3$ (1:1) The resulting slurry is mixed for about 10 minutes followed by drying in an oven at about 150° C. for about 16–18 hours. The resulting dried powder is fired at a rate of about 150° C./hr. to about 650° C. and held at that temperature for about 1 hour.

About 4.7 g of Boehmite alumina is dispersed in about 70 ml deionized water and the pH adjusted to about 3.8 with dilute nitric acid (1:1). The mixture is stirred for about 10 minutes followed by the addition of about 51.5 g of ceria doped (5.45%) gamma alumina prepared as described above and about 18.75 g of ceria. The resulting slurry is roll milled with about 150 g of alumina media for about 18 hours. The pH of the slurry is adjusted to about 3.8 with dilute nitric acid and the viscosity is adjusted to about 30 cps with addition of deionized water.

Cordierite honeycombs made by Corning, Inc. under the name of Celcor$^R$ honeycombs measuring about 1" in diameter and about 1" in length and having about 400 cells/$in^2$ are dipped into the above slurry for about 1 minute. The excess slurry is then shaken off the honeycombs. The honeycomb channels are cleared by blowing compressed air through them. The samples are dried in an oven at about 150° C. for about ½ hour followed by firing in a furnace at about 550° C. for about 3 hours. An average weight loading of about 30–35% of alumina-ceria is observed on these honeycombs. Selected alumina-ceria coated honeycombs are loaded with about 28 g/$ft^3$ of Pt using a predetermined amount of chloroplatinic acid. The noble metal-loaded honeycombs are dried in an oven at about 150° C. for about ½ hour followed by firing in a furnace at about 550° C. for about 3 hours.

Figure 6:
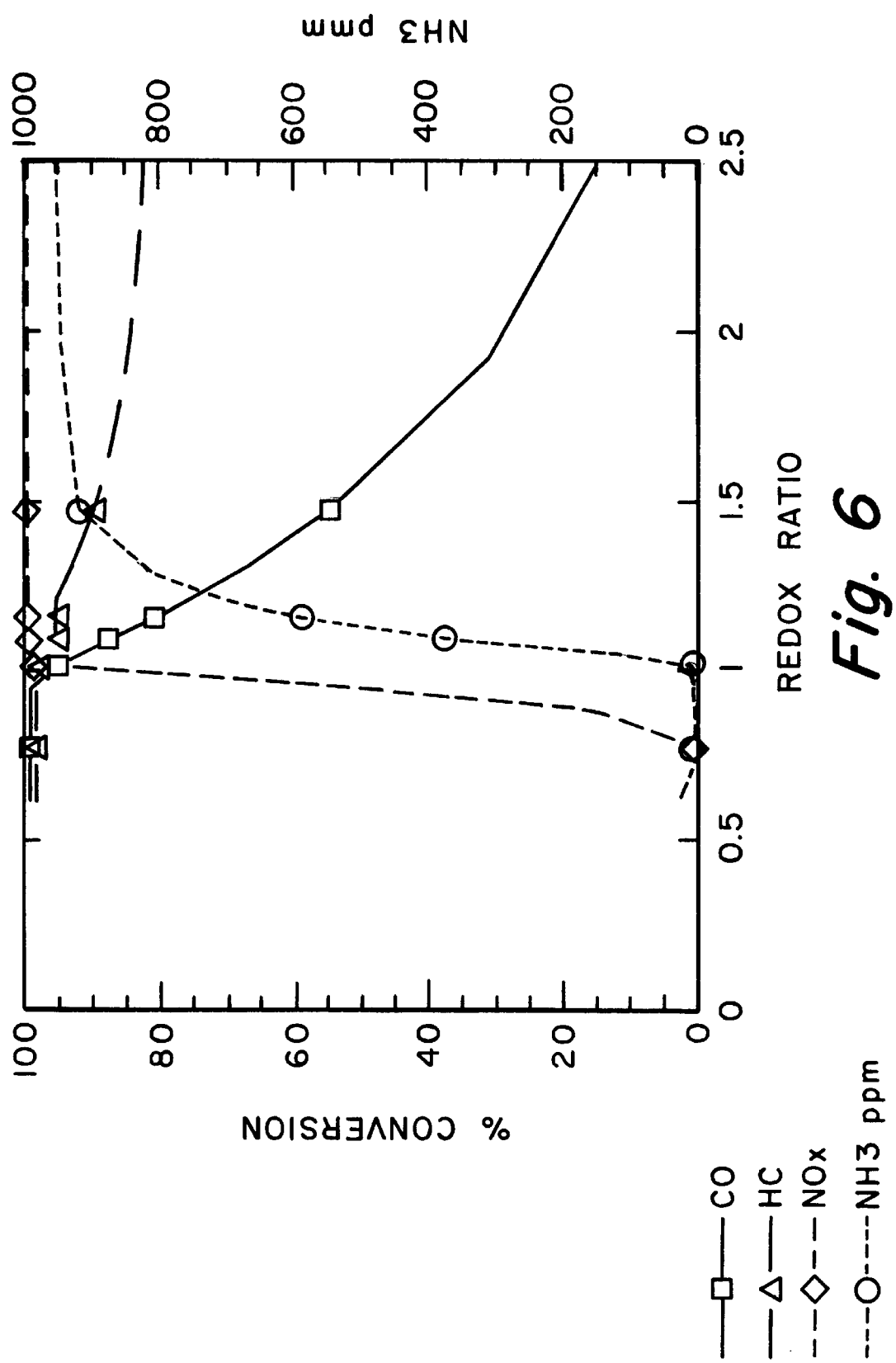
FIG. 6 is a plot of conversion of $NO_x$, CO, and hydrocarbons and production of ammonia versus redox ratio when a Pt/$Al_2O_3$/$CeO_2$ catalyst is used.

A gas mixture as described previously in various redox ratios is contacted with a honeycomb catalyzed with Pt/$Al_2O_3$/$CeO_2$ as described above. The conversions and ammonia formation are given in FIG. 6. Comparisons of Examples 1 and 2 show high ammonia for Example 2 above redox ratios of about 1.01 which is typical of Pt/$Al_2O_3$/$CeO_2$ catalysts (without rhodium).

EXAMPLE 3

Figure 7:
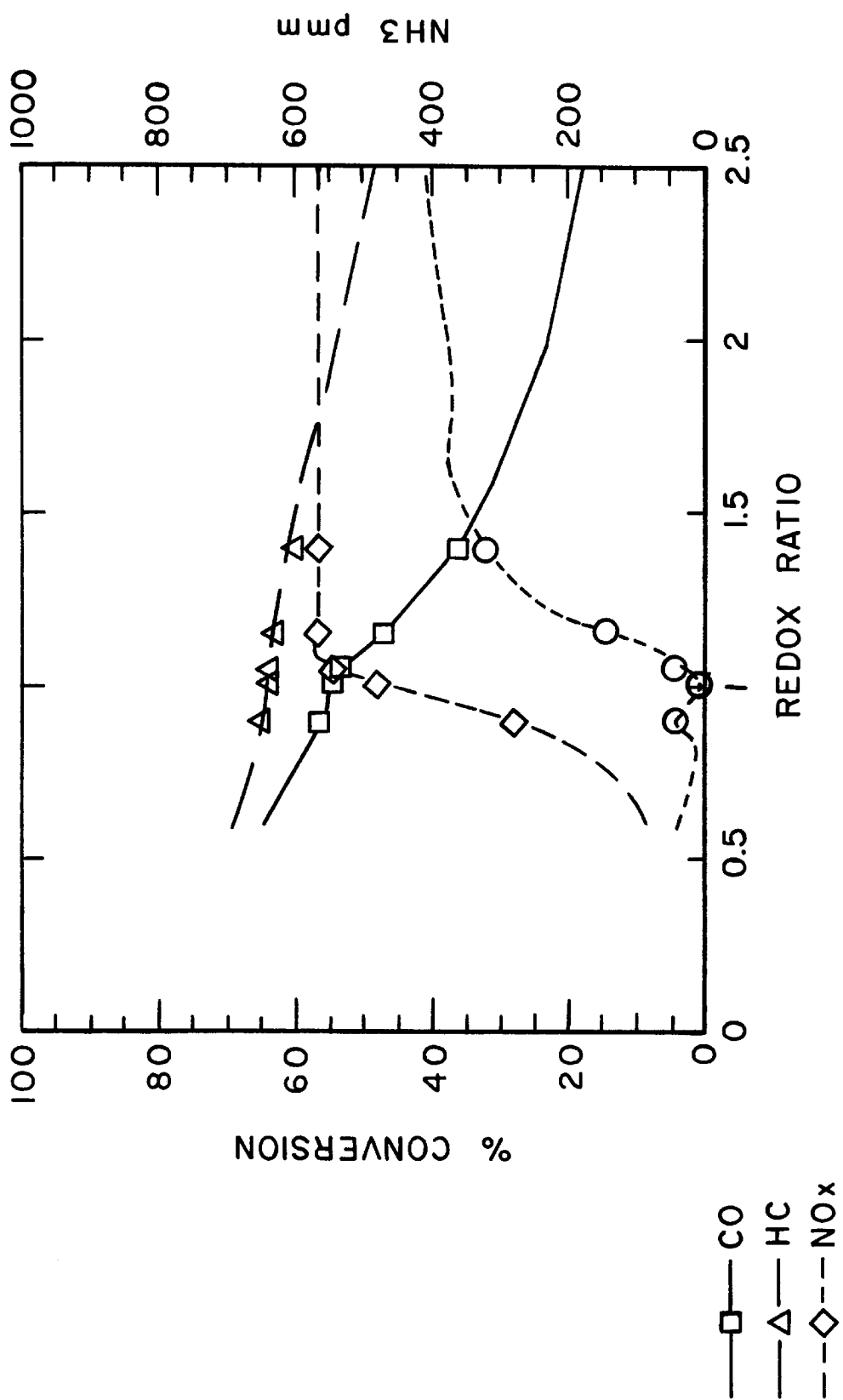
FIG. 7 is a plot of conversion of $NO_x$, CO, and hydrocarbons and production of ammonia versus redox ratio when a fluid mixture is contacted with first stage and auxiliary catalysts of the present invention using the design of FIG. 1.

A gas mixture as described previously is split into two portions or streams. One portion is allowed to flow at various redox ratios through a catalyst system consisting of Pt/$Al_2O_3$—$CeO_2$ on a ceramic honeycomb substrate prepared as described above for Example 2, (first stage). The other portion is allowed to flow through a catalyst system consisting of ZSM-5 zeolite and $Al_2O_3$ coated on the honeycomb substrate (auxiliary stage). In order to achieve control for experimental and comparison purposes, the catalyst systems are fabricated in the same basic design as shown in FIG. 1 with sections B and C corresponding to the Pt/$Al_2O_3$—$CeO_2$ catalyst and sections A and D corresponding to the zeolite $Al_2O_3$ catalyst. Sections A, B, C, and D together measure about 1" in diameter and about 1" in length. The percent conversions and ammonia formation from the first and auxiliary stages are given in FIG. 7. In FIG. 7 it can be seen that over the redox ratio range of the present invention, ammonia is produced and there is conversion of CO and hydrocarbons to innocuous products in the first and auxiliary stages of the present invention.

EXAMPLE 4

Procedure for fabricating Fe mordenite honeycomb

A solution of $FeCl_3$ is made up by dissolving about 200 g of $FeCl_3$. $4H_2O$ in about 1800 ml of deionized water. To this solution is added about 600 g of LZX-5 mordenite by Union Carbide and the resulting slurry is agitated for about 20 hours at about 75°–80° C., filtered and the iron mordenite solid is washed with deionized water. The iron mordenite powder is dried at about 100° C. for several hours followed by calcination at about 500° C. for about 2 hours. About 87 weight parts of the calcined dry powder is mixed with about 17 weight parts of silicone resin powder, and about 6 weight parts of methocel. The mixture is plasticized with about a 50/50 volume mix of water and isopropyl alcohol and extruded into honeycombs. The honeycombs are dried at about 100° C. and then fired at about 500° C. for about 6 hours.

Figure 8:
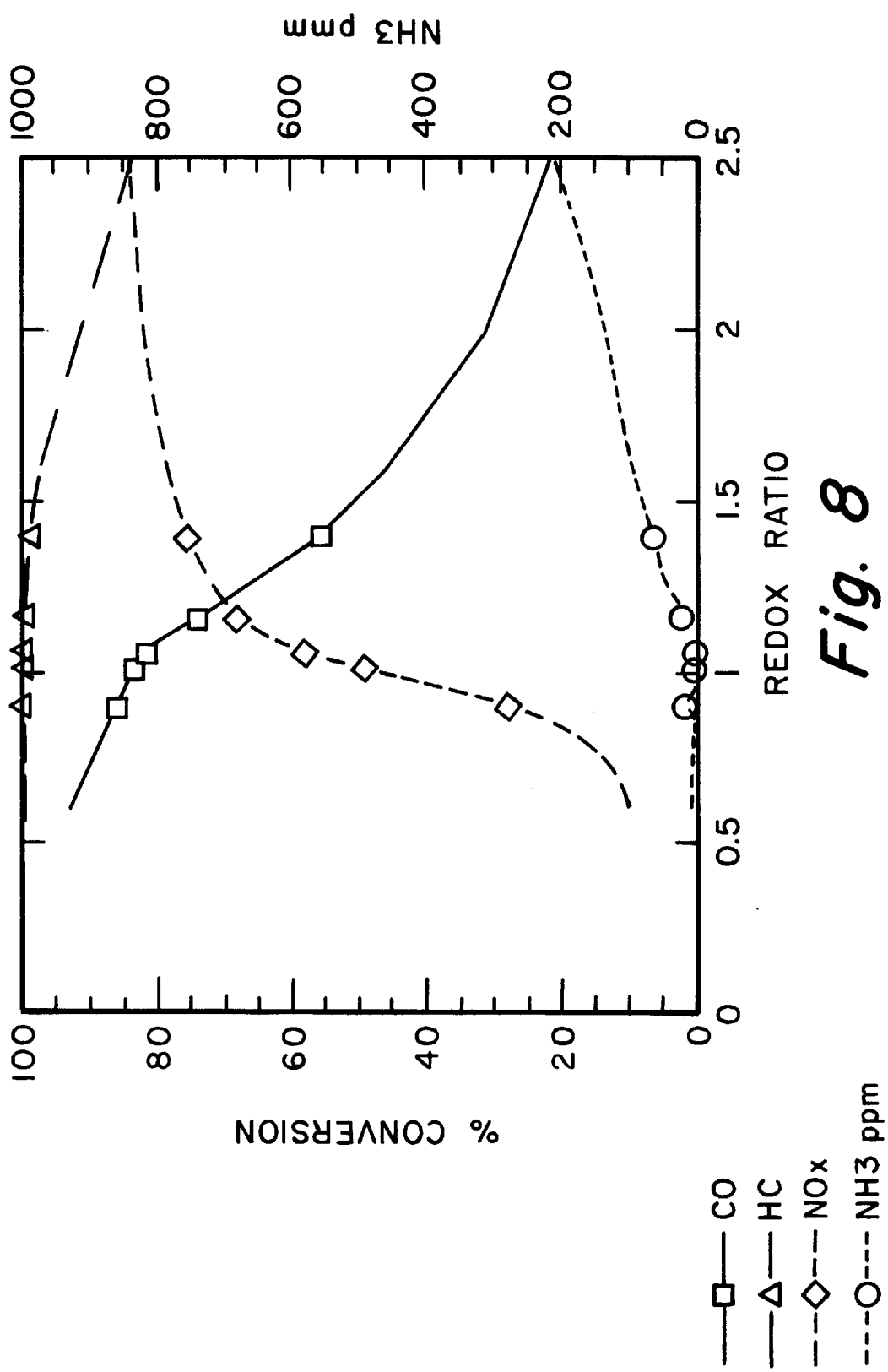
FIG. 8 is a plot of conversion of $NO_x$, CO, and hydrocarbons and production of ammonia versus redox ratio when a fluid mixture is contacted with first, auxiliary, and second stage catalysts of the present invention.

The output gases from both the first stage and auxiliary stage of Example 3 are allowed to come in contact with the Fe mordenite catalyst made as described above (second stage) and positioned downstream from the first stage. The percent conversion and ammonia formation are given in FIG. 8. In FIG. 8 it can be seen that over the redox ratio range of the present invention the ammonia production is low (less than about 220 ppm is considered low for the purposes of the present invention). The major portion of the $NO_x$ in the system is converted to innocuous products. There is also CO and hydrocarbon conversion.

EXAMPLE 5

Figure 9:
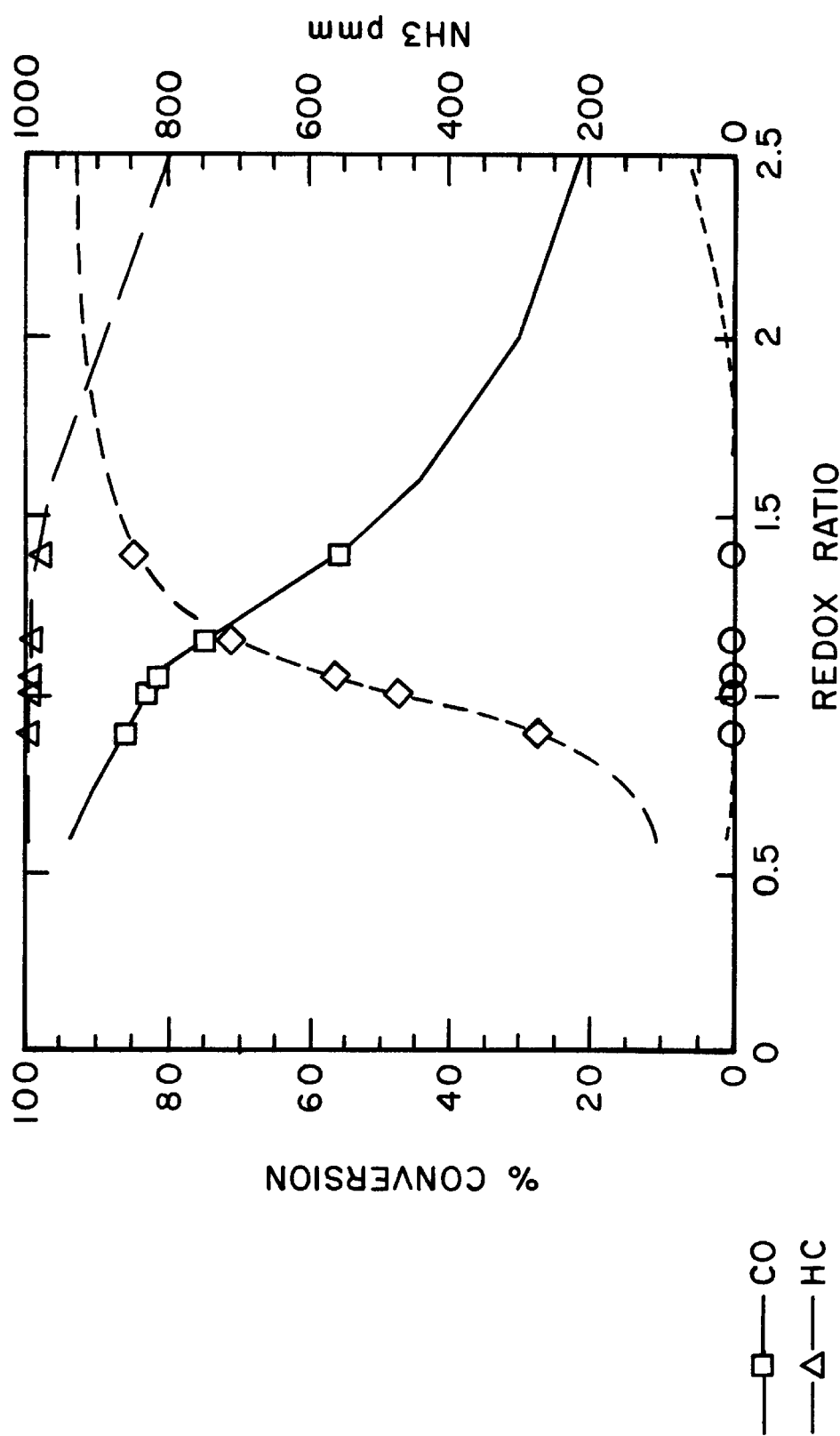
FIG. 9 is a plot of conversion of $NO_x$, CO, and hydrocarbons and production of ammonia versus redox ratio when a fluid mixture is contacted with first, auxiliary, and second stage catalysts in a system in which the output from the first and auxiliary stages is mixed prior to contact with the second stage.

The procedures of Examples 3 and 4 are followed with the addition of two baffles placed before the second stage to insure mixing of the output from the first and auxiliary stages prior to contact with the second stage. The percent conversion and ammonia formation are given in FIG. 9. In FIG. 9 it can be seen that there is essentially no ammonia produced over the redox ratio range of the present invention. This is due to the fact that the the second stage reactions proceed more efficiently because the input to the second stage is uniformly mixed as a result of the baffles. There is also an increase in the $NO_x$ conversion.

EXAMPLE 6

Catalyzing alternate rows of cells in a honeycomb

Alternate rows of cells (alternate channels) of cordierite honeycomb substrates are contacted with catalysts according the the following procedure. Platinum (about 1.0 wt. %) is loaded on ceria predoped (5.45 wt. %) gamma alumina using chloroplatinic acid solution. The resulting mixture is dried in an oven at about 150° C. for about 16–18 hours followed by firing at about 550° C. for about 3 hours. About 4.7 g of Boehmite alumina is dispersed in about 70 ml of water and the pH is adjusted to about 3.8 with dilute nitric acid (about 1:1). The resulting mixture is stirred for about 10 minutes followed by addition of about 70.25 g of the Pt pre-loaded ceria-alumina. The resulting slurry is roll milled with about 150 g of alumina media for about 18 hours. The pH of the slurry is adjusted to about 3.8 with dilute nitric acid and the viscosity is adjusted to about 30 cps with addition of deionized water. A ceramic honeycomb having 100 cells/in$^2$, wall thickness of about 17 mils, and a wall porosity of about 12 microns, measuring about 5.5" in diameter and about 6.25" in length and having alternate channels plugged at both ends with a porous ceramic material is cut into two pieces. The above slurry is poured over the plugged end of each piece so that the slurry passes through the the open channels of each piece which as a result become coated with the Pt/Al$_2$O$_3$/CeO$_2$ (catalyzed portion). The plugged channels remain uncoated (non-catalyzed portion). Excess slurry is removed by shaking and the coated channels are cleared by passing compressed air through them. The honeycombs are dried at about 150° for about ½ hr. The coating procedure is repeated two more times. The honeycombs are dried and then fired at about 550° C. for about 3 hours. About ¼" is cut off the plugged ends of each piece to unplug them. The resulting catalyzed honeycombs are core drilled into 1" diameter×½" long pieces one of which is used in this example and in Example 7.

Figure 10:
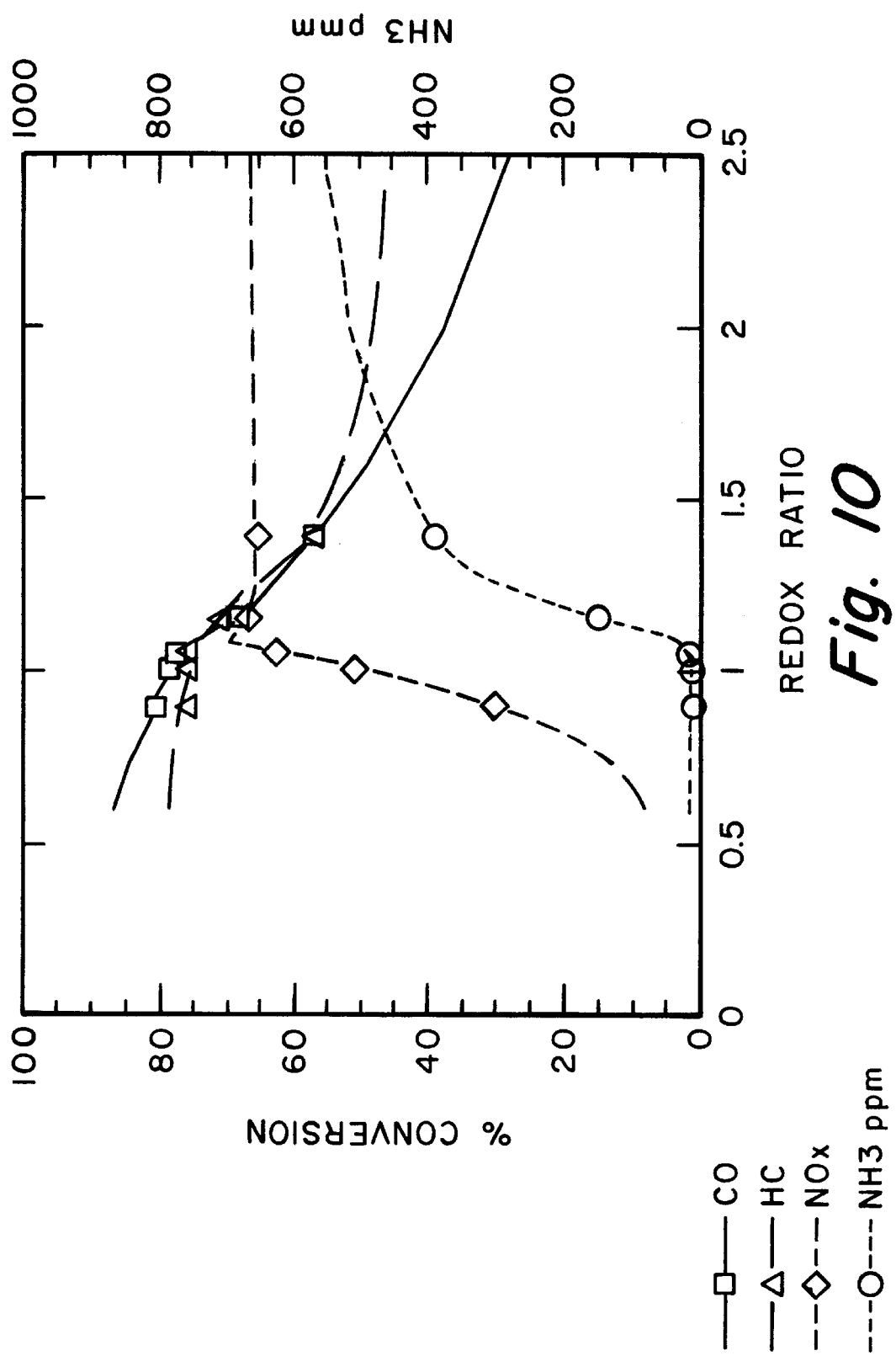
FIG. 10 is a plot of conversion of $NO_x$, CO, and hydrocarbons and production of ammonia versus redox ratio when a fluid mixture is contacted with a honeycomb catalyzed with a first stage catalyst in a pattern of alternating rows of cells.

A mixture of gases as described previously is allowed to come in contact at varying redox ratios with one of the above described alternately catalyzed honeycombs so that half of each mixture is contacted with the catalyzed portion and the other half passes through the non-catalyzed portion of the honeycomb. The percent conversions and formation of ammonia are given in FIG. 10. In FIG. 10 it can be seen that a honeycomb structure with alternating channels catalyzed with the first stage catalyst can be used to carry out first stage reactions to produce ammonia.

EXAMPLE 7

Figure 11:
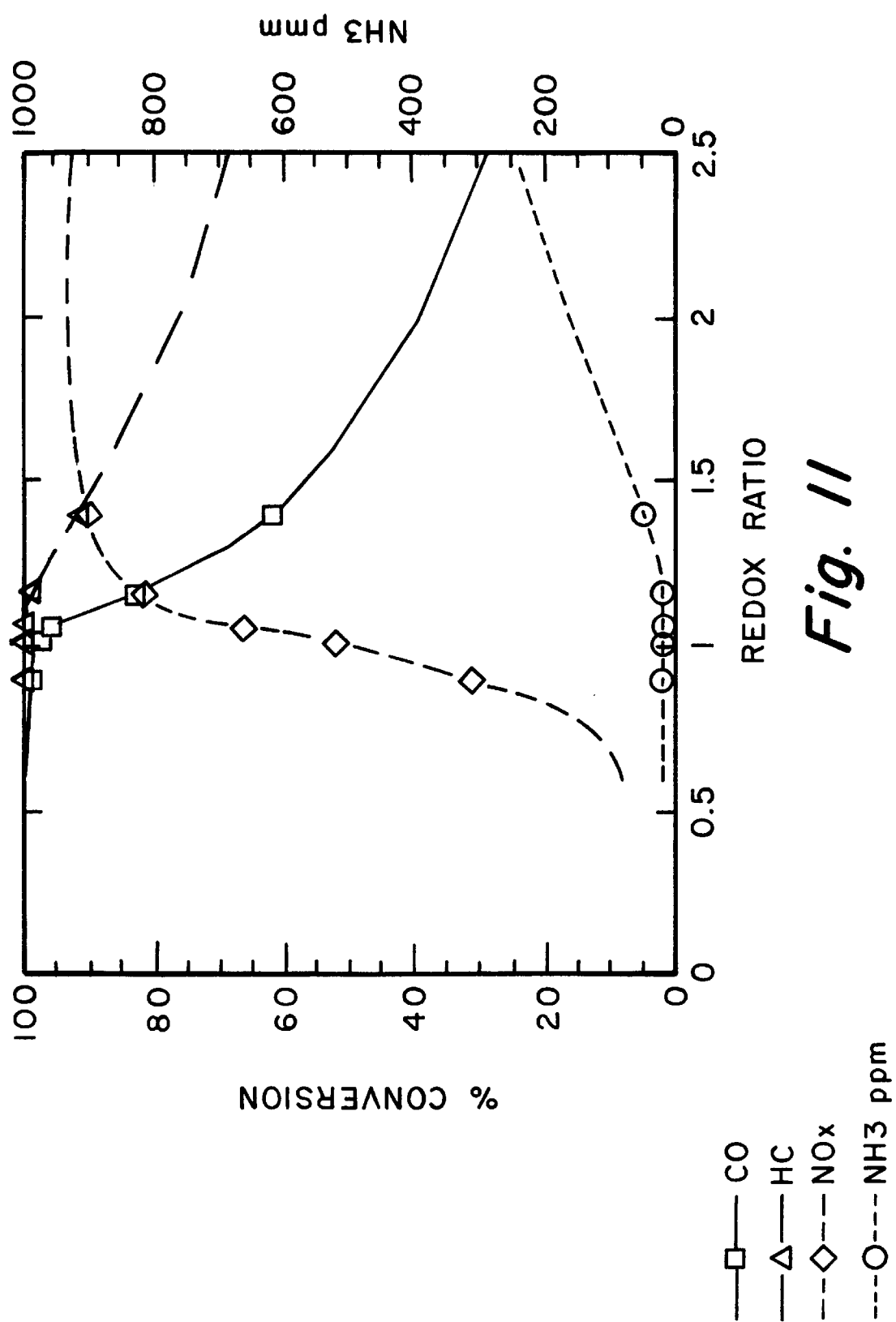
FIG. 11 is a plot of conversion of $NO_x$, CO, and hydrocarbons and production of ammonia versus redox ratio when a fluid mixture is contacted with a honeycomb catalyzed with the first stage catalyst in a pattern of alternating rows of cells and thereafter the output from this stage is contacted with a second stage catalyst.

The output mixtures from the catalyzed and non-catalyzed portions of the honeycomb of Example 6 are allowed to come in contact with an Fe mordenite catalyst placed about ½" downstream (second stage). The percent conversions and formation of ammonia are given in FIG. 11. In FIG. 11 it can be seen that a honeycomb structure having channels catalyzed with the first stage catalyst alternating with non-catalyzed channels can be used with a second stage to carry out the first and second stage reactions of the present invention with no significant amounts of ammonia.

EXAMPLE 8

The following example demonstrates the excellent activity obtained with chromium-exchanged into mordenite (Conteka CBV-20A, SiO$_2$/Al$_2$O$_3$ mole ratio of 20) using 0.4M chromium nitrate solution. After ion-exchange, the zeolite was calcined and washcoated on a cordierite honeycomb with 15% Al$_2$O$_3$ binder. A 1" (2.54 cm) diameter×1" (2.54 cm) long piece of this washcoated honeycomb was then placed downstream of a cordierite honeycomb (1" (2.54 cm) dia×0.5" (1.27 cm) long) in which the alternate channels were coated with an Al$_2$O$_3$—CeO$_2$ washcoat that had been loaded with platinum. A 0.5" (1.27 cm) gap was also included between these two honeycombs (Stages I and II). This configuration was tested on a bench test reactor using a simulated exhaust gas at 600° C., and the conversion of CO, hydrocarbons, and $NO_x$ was measured as a function of redox ratio. The catalyst loadings were about 25 g/ft$^3$ (about 0.9 g/l) of Pt on Stage I, and about 19.6 g/ft$^3$ (about 0.7 g/l) Cr on Stage II. The results showed that this catalyst has excellent CO, hydrocarbon, and $NO_x$ conversions. In particular, the $NO_x$ conversion at a reducing side redox ratio of 1.25 was about 94%, with no ammonia formation (net $NO_x$ conversion is 94%).

It should be understood that while the present invention has been described in detail with respect to certain illustrative embodiments thereof, it should not be considered limited to such but may be used in other ways without departing from the spirit of the invention and the scope of the appended claims.

What is claimed is:

1. An apparatus suitable for converting $NO_x$, CO, and hydrocarbons in exhaust gases to innocuous products, said apparatus comprising:

a) a first catalytic unit comprising an inlet end and an outlet end and a multiplicity of open-ended cells extending from said inlet end to said outlet end, wherein said exhaust gases pass from said inlet end to said outlet end, a portion of the cells being catalyzed with a first stage catalystcomprising a noble metal and a support for converting a portion of $NO_x$ in the exhaust gases to ammonia, and the remaining portion of cells being catalyzed with an auxiliary catalyst for removing hydrocarbons from the exhaust gases, said first stage catalyst and said auxiliary catalyst being absent rhodium;

b) a first conduit connected to the inlet end of said first unit, for conveying said exhaust gases to said inlet end of said first unit wherein the reduction of a portion of the $NO_x$ in the exhaust gases is effected to produce ammonia, and hydrocarbons are removed, thereby yielding a modified gas mixture;

c) a second catalytic unit comprising an inlet end and an outlet end, and a multiplicity of open ended cells extending from said inlet end to said outlet end, said unit being catalyzed with a second stage catalyst, said second stage catalyst being absent rhodium; and d) a second conduit one end of which is connected to said outlet end of said first unit and the other end of which is connected to the inlet end of the second unit, the second conduit being connected only to the first and second units, for conveying only the modified gas mixture to said second unit to effect second stage reactions in which the ammonia is reacted with the remaining $NO_x$, thereby yielding a converted gas mixture, the passage of the exhaust gases through the first, auxiliary, second stage catalysts resulting in the conversion of $NO_x$, CO, and hydrocarbons to innocuous products, the inlet end of said second unit being connected only to the other end of the second conduit.

2. An apparatus of claim 1 wherein an exit conduit is connected to the outlet end of the second unit for conveying the converted gas mixture to ambient atmosphere.

3. An apparatus of claim 1 wherein said noble metal of said first stage catalyst is selected from the group consisting of platinum, palladium, and combinations thereof.

4. An apparatus of claim 3 wherein said noble metal is present at a level of about 0.01% to about 5% by weight of said first stage catalyst.

5. An apparatus of claim 1 wherein a water gas shift component is present as part of said first stage catalyst.

6. An apparatus of claim 1 wherein said first stage catalyst is selected from the group consisting of a combination of platinum, cerium oxide and aluminum oxide, a combination of palladium, cerium oxide and aluminum oxide, and a combination of platinum, palladium, cerium oxide and aluminum oxide.

7. An apparatus of claim 1 wherein said first stage catalyst consists essentially of in percent by weight about 0.8 to about 2.0 noble metal, about 25 to about 40 ceria, and the balance alumina.

8. An apparatus of claim 1 wherein said first stage catalyst consists essentially of in percent by weight about 0.01 to about 5 noble metal, about 20 to about 50 ceria, and the balance alumina.

9. An apparatus of claim 1 wherein the portion of the exhaust gases which is not converted to ammonia by the first stage catalyst are contacted with the remaining portion of the cells of the first unit, said remaining portion of cells being catalyzed with an auxiliary catalyst, to remove hydrocarbons, said auxiliary catalyst being absent rhodium.

10. An apparatus of claim 9 wherein said auxiliary catalyst is a molecular sieve.

11. An apparatus of claim 1 wherein said second stage catalyst is a molecular sieve with at least one metal.

12. An apparatus of claim 11 wherein the metal has an atomic number of 21 thru 30.

13. An apparatus of claim 12 wherein the metal has an atomic number of 22 thru 29.

14. An apparatus of claim 11 wherein the metal has an atomic number of 39 thru 42.

15. An apparatus of claim 11 wherein the metal has an atomic number of 44 thru 47.

16. An apparatus of claim 11 wherein said molecular sieve is selected from the group consisting of mordenite, pentasil structure zeolite, faujasite, and combinations thereof.

17. An apparatus of claim 16 wherein the metal is selected from the group consisting of Pt, Pd, Co, Cr, Ni, Fe, Cu, Mn, V, Mo, W, La, Ru, Re, Ir, and combinations thereof.

18. An apparatus of claim 11 wherein said second stage catalyst comprises a metal-zeolite component selected from the group consisting of iron zeolites, copper zeolites, and combinations thereof.

19. An apparatus of claim 1 wherein said units are made of materials selected from the group consisting of ceramics, glasses, glass ceramics, metals, metal oxides, molecular sieves, and combinations thereof.

20. An apparatus of claim 19 wherein said units have honeycomb structures.

21. An apparatus of claim 1 wherein the portion of cells of said first unit which are not catalyzed with said first stage catalyst are uncatalyzed.

22. An apparatus of claim 1 wherein said first stage catalyzed cells are arranged in a pattern of alternating rows with the remaining portion of cells.

23. An apparatus of claim 1 wherein the first stage catalyzed cells are arranged in a pattern of alternate approximate quarters with the remaining portion of cells.

* * * * *

UNITED STATES PATENT AND TRADEMARK OFFICE
CERTIFICATE OF CORRECTION

PATENT : 5,863,508
DATED : January 26, 1999
INVENTOR(S) : Irwin M. Lachman

It is certified that error appears in the above-identified patent and that said Letters Patent is hereby corrected as shown below:

On the title page, item [75] Inventor(s): the third inventor's name should read as follows:

--Srinivas H. Swaroop--.

Signed and Sealed this

Ninth Day of March, 1999

*Attest:*

Q. TODD DICKINSON

*Attesting Officer*     Acting Commissioner of Patents and Trademarks

UNITED STATES PATENT AND TRADEMARK OFFICE
CERTIFICATE OF CORRECTION

PATENT NO. : 5,863,508
DATED : January 26, 1999
INVENTOR(S) : Irwin M. Lachman

It is certified that error appears in the above-identified patent and that said Letters Patent is hereby corrected as shown below:

On the title page, item [75] Inventor(s): the third inventor's name should read as follows:

--Srinivas H. Swaroop--.

Signed and Sealed this

Twenty-third Day of March, 1999

Attest:

Q. TODD DICKINSON

Attesting Officer

Acting Commissioner of Patents and Trademarks

UNITED STATES PATENT AND TRADEMARK OFFICE
CERTIFICATE OF CORRECTION

PATENT NO.   : 5,863,508
DATED        : January 26, 1999
INVENTOR(S)  : Lachman et al.

It is certified that error appears in the above-indentified patent and that said Letters Patent is hereby corrected as shown below:

On the title page, Item [75], inventors
"Patel" should be --Patil--

Column 12, line 40, "LZX-5" should be --LZM-5--.

Column 14, line 44, "catalystcomprising" should be --catalyst comprising--.

Signed and Sealed this

First Day of June, 1999

Attest:

Q. TODD DICKINSON

Attesting Officer

Acting Commissioner of Patents and Trademarks